United States Patent [19]

Rosenberg et al.

[11] Patent Number: 5,014,627

[45] Date of Patent: May 14, 1991

[54] STABLE INSTRUMENT BENCH WITH REPLICATED PRECISION SURFACE

[75] Inventors: Larry Rosenberg, San Jose; Curt H. Chadwick, Los Gatos; Alex Brudny, San Jose, all of Calif.

[73] Assignee: KLA Instruments Corporation, San Jose, Calif.

[21] Appl. No.: 433,386

[22] Filed: Nov. 6, 1989

Related U.S. Application Data

[60] Continuation of Ser. No. 243,268, Sep. 12, 1988, abandoned, which is a division of Ser. No. 158,252, Feb. 19, 1988, Pat. No. 4,889,676.

[51] Int. Cl.$^5$ ............................................. A47B 83/00
[52] U.S. Cl. ................................... 108/50; 108/25; 297/457
[58] Field of Search ................ 108/41, 50, 25, 26; 297/157, 457, 421, 232; 52/103, 309.7; 312/140.3

[56] References Cited

U.S. PATENT DOCUMENTS

| | | | |
|---|---|---|---|
| 1,886,988 | 11/1932 | Thelen | 297/445 |
| 2,555,547 | 6/1951 | Kelleghan | 108/25 |
| 2,711,786 | 6/1955 | Weiss | 297/457 |
| 3,204,545 | 9/1965 | Benson | 108/50 |
| 3,550,448 | 12/1970 | Ensign | 108/50 |
| 3,606,508 | 9/1971 | Burnes | 312/140.3 |
| 3,723,163 | 3/1973 | Schumacher | 428/419 |
| 3,748,012 | 7/1973 | Abelman | 297/457 |
| 3,875,873 | 4/1975 | Howitt | 108/25 |
| 3,908,214 | 9/1975 | DoLoreto | 411/276 |
| 3,939,976 | 2/1976 | VanIseghem, Jr. | 108/50 |
| 4,070,075 | 1/1978 | Morgan | 108/50 |
| 4,325,665 | 4/1982 | Jukes | 411/176 |
| 4,539,345 | 9/1985 | Hansen | 524/262 |
| 4,585,821 | 4/1986 | Progneaux et al. | 524/425 |

Primary Examiner—Kenneth J. Dorner
Assistant Examiner—Brian K. Green
Attorney, Agent, or Firm—Allston L. Jones

[57] ABSTRACT

An instrument table having two features is disclosed. The first is a stable instrument bench that is constructed of sections of precast reinforced concrete. Each of these sections are then moisture sealed with a plastic coat or paint, then assembled using epoxy and bolts. The second element of the present invention is the replication of a precision surface on the table portion of an instrument bench. The replication of the precision surface entails the application of a bead of plastic to the selected portions of the instrument table, lowering of a jig having a portion of the underside thereof machined or ground to the selected specifications of the surface to be replicated onto the instrument table thereonto, supporting the jig a selected distance above the surface of the instrument table to push out the plastic into a pad of a thickness that is equivalent to the distance above the table at which the jig is supported, and removing the jig after the plastic is cured thus leaving behind the plastic pad that has thereon a precision surface that replicates the machined or ground surface on the underside of the jig.

15 Claims, 3 Drawing Sheets

STABLE INSTRUMENT BENCH WITH REPLICATED PRECISION SURFACE

This is a continuation of copending application Ser. No. 07/243,268 filed on Sept. 12, 1988 now abandoned which was a divisional of Ser. No.: 07/158,252 filed on FEB. 19, 1988, now U.S. Pat. No. 4,889,676.

CROSS REFERENCE

This application is related to another patent application entitled "Automatic High Speed Optical Inspection System" filed in the names of Robert R. Sholes, Mike E. Fein, Curt H. Chadwick, Frank D. Tucker and John D. Greene and assigned to the same assignee as the present application.

BACKGROUND OF THE INVENTION

The present invention relates to stable instrument tables and benches with precision sufaces, and more particlarly to instrument tables and benches where the precision surface is created by the technique of replication.

There are many applications which require a stable instrument table that is not subject to vibrations which have a precision surface where close alignment tolerances are required. The fields of optics, tool making, and the design of large high speed X-Y stages are three such areas. The use of a machined or ground slab of granite is traditionally used for these applications, however, the costs of machining and grinding a large table, say five feet by seven feet, as a base for a large high speed X-Y stages is very high. For smaller tables the cost of granite is also several times higher than the cost of a concrete table with a replicated surface of the present invention. The costs quickly become prohibitive to use a granite slab as the size of the bench grows. Additionally, if the granite slab is to be used as part of an instrument bench, and exterior shell, or cabinet, is still required to form the remainder of the instrument bench.

It would be desirable to have a method for producing a large, precision instrument table or bench without having to machine or grind the surface of each instrument bench. The present invention provides a method for producing such a large, stable, precision surfaced instrument bench.

SUMMARY OF THE INVENTION

In accordance with the illustrated embodiments, the present invention provides first a stable instrument bench having a precast reinforced concrete table portion disposed to receive a selected instrument, and a precast reinforced concrete support means for the table portion. Also, the side supports can be esthetically contoured and painted to serve as the major exterior cabinet panels. The remainder of the instrument cabinet can be completed using simple flat panels of any desired material.

Additionally, the present invention provides a method of replicating a precision surface on an instrument table, and an instrument table having a precision surface produced by the process of replication. The steps in the method and process include applying a bead of a hardenable plastic material (e.g. epoxy) to at least one portion of the surface of the instrument table where the precision surface is to be created. Next, a jig, having at least a portion of the bottom surface thereof machined or ground to the specifications of the precision surface to be created on the instrument table, is lowered onto the instrument table with the machined or ground bottom portion thereof the plastic material and the portion of the surface of the instrument table where the precision surface is to be created. The machined or ground surface of the jig is supported above the surface of the instrument table a distance that is equivalent to the desired height of the cured plastic layer, allowing the plastic to harden beneath the surface of the jig. When the plastic is cured, the jig is removed from the instrument table leaving thereon a plastic layer having a top surface that is a replication of the machined or ground bottom surface of the jig.

DESCRIPTION OF THE PREFERRED EMBODIMENT

Figure 1:
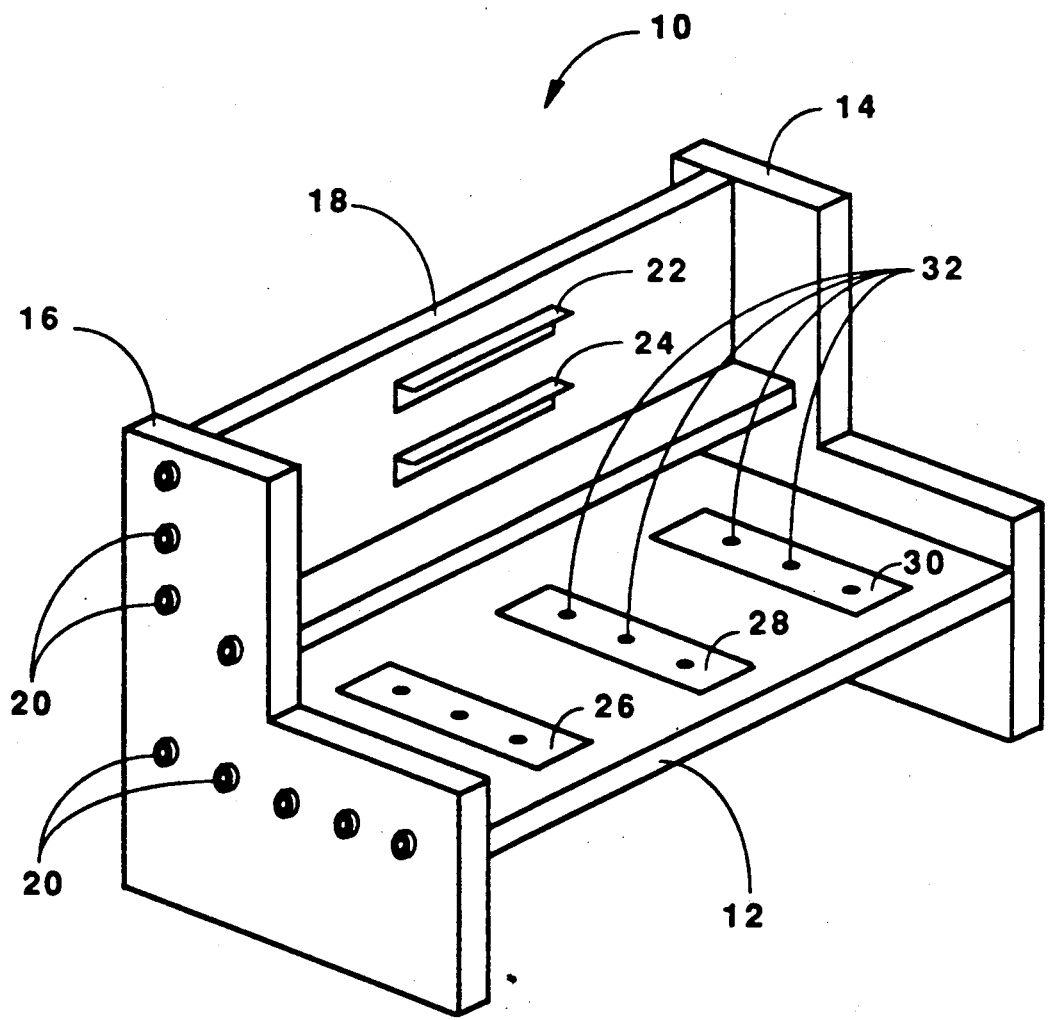
FIG. 1 is a prespective view of an instrument bench that incorporates a replicated precicion surface of the present invention on the surface of the table portion of the bench.

Referring to FIG. 1 there is shown an instrument bench 10 having a table portion 12, sides 14 and 16, and a back portion 18. For an application, such as a high-speed X-Y stages, bench 10 must be a stable structure not subject to the vibrations induced by the motions of the X-Y stage. To accomplish this a massive structure is needed. Any number of materials could be selected from which to manufacture the bench. It has been determined by the applicants that a bench manufactured from pre-cast reinforced concrete, together with the surface replication method described below, provides a stable, low cost structure with substantially the same characteristics as a granite bench. The cost of such a concrete structure with a replicated precision surface is only a fraction of the cost of the granite bench. The one characteristic of the untreated concrete that is unlike granite is its porous surfaces which leaves it open to the absorption of moisture, To prevent that, the concrete for the instrument bench needs to be sealed. One way of doing that is to completely paint all surfaces of each of the concrete components of the bench with a polyurathane paint.

The concrete instrument bench of FIG. 1 is assembled by placing a bead of epoxy on each end of table portion 12 and back portion 18 before sides 14 and 16 are bolted ontor them by means of bolts 20. On the top of table portion 12 there are shown three replicated precision surface 26-30 that are created by the replication method that is discussed below. Extending through each of these surfaces into the concrete table top there is also shown tapped holes 32. These are created by placing tapped bolt inserts into the concrete mold just below the concrete surface with a bolt therein extending through a portion of the molding forms to hold it in place during casting of the concrete. Those bolts are removed to remove the cast concrete part from its mold, and then other bolts are inserted into the threaded inserts to prevent the fouling of the inserts during the replication stage. The bolts are selected to have a shaft that is long enough to extend above ethe replicated epoxy surface to make their removal possible without damaging the finished surface of the precision epoxy surfaces. To further ease the removal of the bolts when the epoxy is cured, the bolts may be coated with a grease or mold release that is non-reactive with the concrete or the epoxy.

Tapped holes 32 are provided to mount the desired fixtures to table 12. In the applicant's application the instrument bench was designed to accommodate a high-speed X-Y stages, thus the precision rails on which the stage is mounted would be bolted to table portion 12 by means of tapped holes 32. Since the surfaces 26-30 have been replicated in such a way that the individual surfaces are flat within a selected tolerance, each surface with respect to each other surface is a portion of the same plane within the same tolerance as the flatness pf each individual surface, however, surfaces that are not coplanar can also be created. That being the case, mounting brackets for other portions of the device that need to be precisely aligned with the instrument mounted on the replicated surfaces can be located elsewhere on the bench 10 with a precision jig mounted to those surfaces. For example, if angle irons 22 and 24 need to be precisely located on back 18, a jig could be mounted on the X-Y stage rails and moved into position on back 18 with an epoxy bead between them and the back. The jig would then be left in place until the epoxy cures, at which time it would be removed. This then provides the precise alignment of the device mounted on angle irons 22 and 24 with the instrument mounted on the epoxy pads 26-30. This eliminates the necessity of the use of expensive mounting and alignment procedures.

Figure 2:
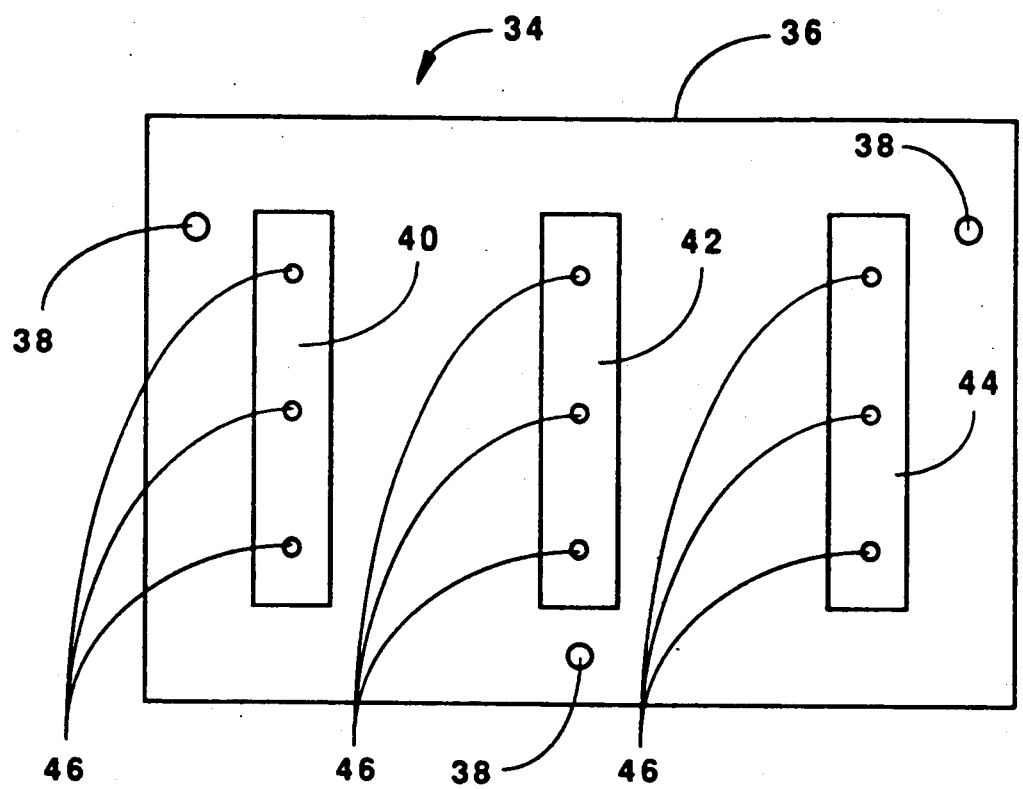
FIG. 2 is an plan bottom view of a replication plate of a representative design for creating a replicated precision surface as per the present invention.
Figure 3:
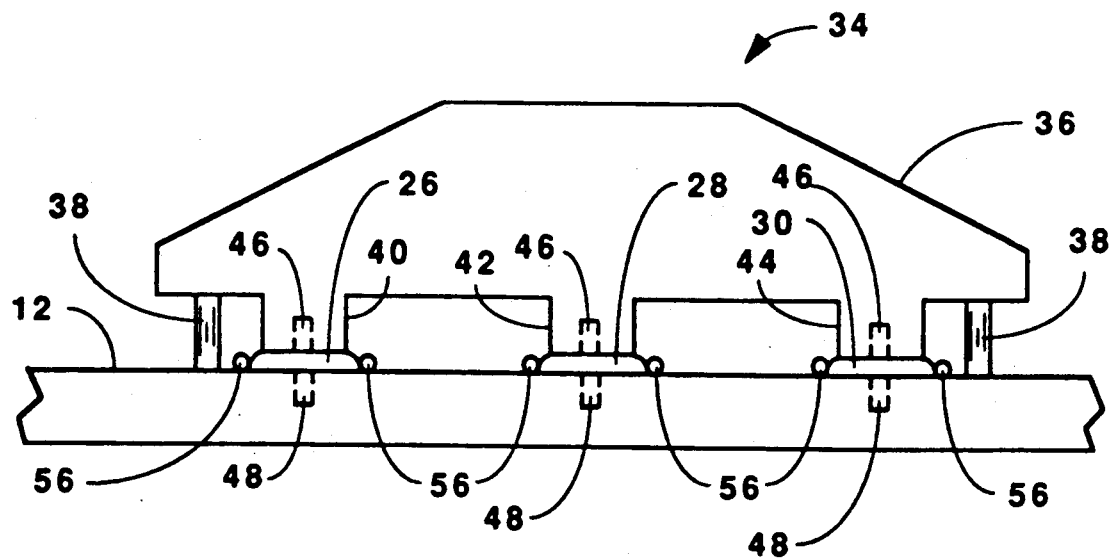
FIG. 3 is an plan end view of the replication plate of FIG 2.

FIGS. 2 and 3 illustrate the replication jig 34 for creating the precision surfaces as shown in FIG. 1. Jig 34 includes a main plate 36 from which selected precision surfaces 40-44 and three support legs 38 extend outward therefrom. Each of surfaces 40-44 are ground flat within a selected tolerance and may or may not be coplanar with each other to the same tolerance as desired. For applicants specific application the selected tolerance for both is 0.001 inches. With the use of three legs 38 to define the plane of the replicated surfaces, the flatness of the base surface of table 12 is not critical, it merely needs to be substantially flat.

In FIG. 3 threaded inserts 48 are shown in dotted outline in the surface of table portion 12 directly opposite pilot holes 46 which are drilled into surfaces 40-44 of jig 36 to accommodate the heads of the bolts screwed into threaded inserts 48 during the replication process to prevent fouling of inserts 48.

To create precision surface 26-30 on table portion 12 dams of putty rope 56 are placed on the table surrounding the areas where the precision surfaces are to be created if the epoxy mentioned below is a fluid before it is cured. A bead of a selected epoxy (Concresive Adhesive) is placed on table 12 within the putty dams and in the vicinity of tappped inserts 32, a release agent is sprayed onto surface 40-44 of jig 34, jig 34 is then lowered in alignment with table 12 so that the heads of the bolts in tapped inserts 32 mate with pilot holes 40, the lowering of jig 34 continues until it comes to rest on its three support legs 38 with each of said legs extending below the faces of surfaces 40-44 pushing the epoxy bead and the putty dams out flat to create an epoxy pad of a selected thickness. For the applicant's application, that dimension was selected to be 0.06 inches to create epoxy pads of that thickness. Jig 34 is left in place until the epoxy is fully cured and then it is lifted off table 12, thus leaving behind surfaces 26-30 which match, or replicate, surfaces 40-44, respectively, of jig 34. The greased or mold release coated anti-fouling bolts inserts 32 and table 12 is then ready to accept the instrument that is to be mounted thereon.

Thus, any number and shape of surfaces can be replicated on table 12 by simply using a jig 34 having precision surfaces of the desired shapes and spacings, including replication of the entire surface of table 12. An alternate to jig 34 of FIGS. 2 and 3 would be the use of a granite block, or blocks, for replicating portions or all of the surface of table 12 in a similar manner.

Figure 4:
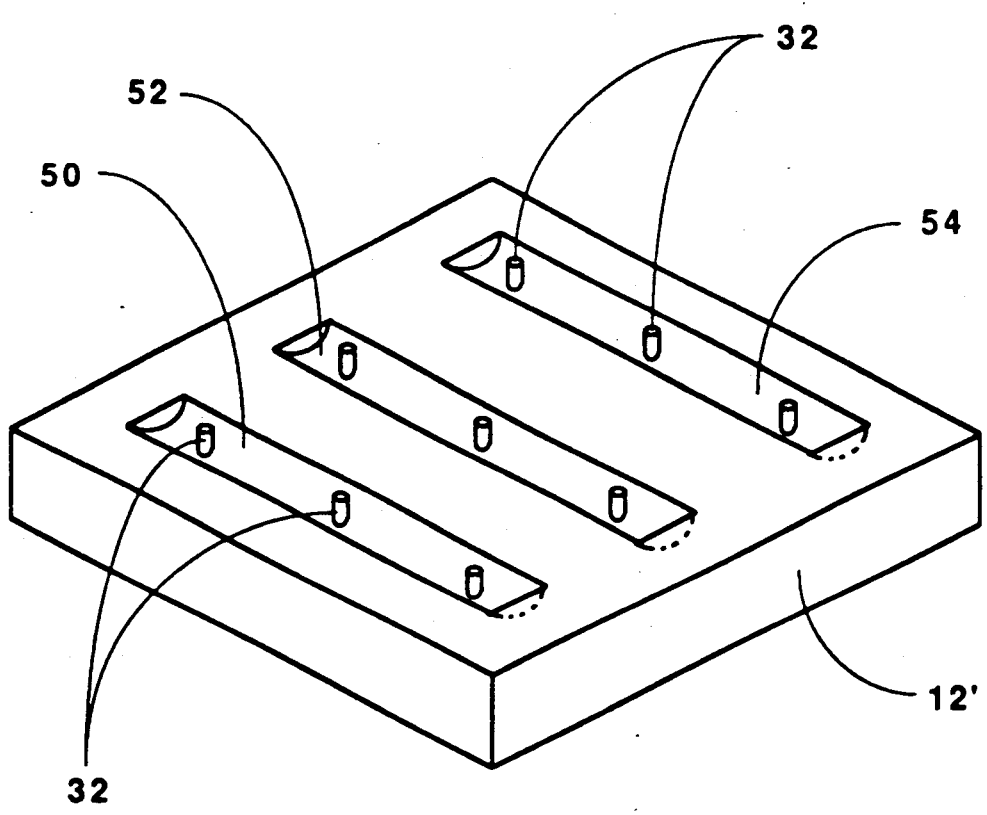
FIG. 4 is a perspective view of an alternative table portion of the instrument bench of FIG. 1.

In FIG. 4 there is shown an alternative table portion 12' with the areas in which the precision surfaces 26-30 are to be formed are shallow troughs 50-54 formed therein. Extending upward out of the surface of troughs 50-54 are tapped inserts 38 with one end imbedded into the lower surface thereof with their upper ends being substantially flush with the dtop surface of table portion 12'. The replication of the surfaces 26-30 on table portion 12' would be preformed in substantially the same manner as discussed above, however, the use of troughs 50-54 provides the option of using another material that is more fluid in its uncured state without the necessity of the putty dams. With this design one could, for example, use concrete instead of an epoxy that has a jelly like consistancy.

Instrument tables and benches can be fabricated from many different types of materials, or combinations of materials, in addition to concrete, including wood, plastic, various metals, and granite. With any one of these materials, or any other material with a relatively smooth surface, a precision surface can be created thereon by the replication method of the present invention. Depending on the material selected, the characteristics of the selected replicating surface material may be such that it is not self-priming which would then require the additional step of priming table portion 12 before the replicating surface material is placed thereon so that the cured replicated surface material will adhere to table portion 12. Any material with plastic characteristics that hardens may be a viable material for the precision surfaces to be replicated onto the table portion. In selecting the material from which the instrument bench is to be manufactured the user would also take into consideration other factors such as cost, stability, thermal characteristics, chemical reactivity, density, etc. Thus, the variations possible for the present invention would clearly be recognized by one skilled in the art, and therefore the scope protection for the present invention should only be limited by the scope of the following claims.

What is claimed is:
1. A stable instrument bench comprising:
   a precast concrete table portion having a substantially horizontal top surface;
   at least one hardened plasstic pad having a top and a bottom surface, said bottom surface of said pad adhering to a portion of said top surface of said table portion and the top surface of said plastic pad having a replicated precision top surface with said replicated surface being other than a replication of the top surface of the table portion, said replicated surface of said pad being disposed to receive a selected instrument; and precast concrete support means for supporting said table portion.

2. A bench as in claim 1 further including a sealant means for sealing those surface portions of said table portion which do not have a plastic pad adhering thereto and said support means to prevent the absorption of moisture thereby.

3. A bench as in claim 1 wherein said table portion and said support means are precast reinforced concrete.

4. A bench as in claim 1 wherein said table portion defines at least one trough in the top surface thereof, each trough for receiving said bottom surface of one of said at least one hardened plastic pad.

5. A bench as in claim 1 further including at least one tapped bolt insert with one end thereof retained in the top surface of the table portion with its other end extending into a hole through said plastic pad with said other end extending to a point below the replicated precision top surface of the hardened plastic pad to permit access to the bolt insert for attaching said selected instrument to the instrument bench.

6. A bench as in claim 4 further including at least one tapped bolt insert with one end thereof retained in the top surface of the table portion with its other end extending into a hole through said plastic pad with said other end extending to a point below the replicated precision top surface of the hardened plastic pad to permit access to the bolt insert for attaching said selected instrument to the instrument bench.

7. A bench as in claim 5 wherein said table portion defines at least one trough in the top surface thereof, each trough for receiving said bottom surface of one of said at least one hardened plastic pad.

8. A stable instrument bench comprising:
a precast concrete table portion having a substantially horizontal top surface;
at least one hardened plastic pad having a top and a bottom surface, said bottom surface of said pad adhering to a portion of said top surface of said table portion and the top surface of said plastic pad having a replicated precision top surface with said replicated surface being other than a replication of the top surface of the table portion, said replicated surface of said pad being disposed to receive a selected instrument; and
precast concrete support means for supporting said table portion;
said table portion defines at least one trough in the top surface thereof, each trough for receiving said bottom surface of one of said at least one hardened plastic pad.

9. A bench as in claim 8 further includling at least one tapped bolt insert with one end thereof retained in the top surface of the table portion its other end extending into a hole through said plastic pad with said other end extending to a point below the replicated precision top surface of the hardened plastic pad to permit access to the bolt insert for attaching said selected instrument to the instrument bench.

10. A bench as in cliam 9 further including a sealant means for sealing those surface portions of said table portion which do not have a plastic pad adhering thereot and said support means to prevent the absorption of moisture thereby.

11. A bench as in claim 9 wherein said table portion and said support means are precast reinforced concrete.

12. A stable instrument bench comprising:
a precast concrete table portion having a substantially horizontal top surface;
at least one hardened plastic pad having a top and a bottom surface, said bottom surface of said pad adhering to a portion of said top surface of said table portion and the top surface of said plastic pad having a replicated precision top surface with said replicated surface being other than a replication of the top surface of the table portion, said replicated surface of said pad being disposed to recieve a selected instrument;
precast concrete support means for supporting said table portion; and
at least one tapped bolt insert with one end thereof retained in the top surface of the table portion with its other end extending into a hole through said plastic pad with said other end extending to a point below the replicated precision top surface of the hardened plastic pad to permit access to the bolt insert for attaching said selected instrument to the instrument bench.

13. A bench as in claim 12 wherein said table portion defines at least one trough in the top surface thereof, each trough for receiving said bottom surface of one said at least one hardened plastic pad.

14. A bench as in claim 13 further including a sealant means for sealing those surface portions of said table portion which do not have a plastic pad adhering thereto and said support means to prevent the absorption of moisture thereby.

15. A bench as in claim 13 wherein said table portion and said support means are precast reinforced concrete.

* * * * *